United States Patent

Hagstrom

[11] Patent Number: 5,898,110
[45] Date of Patent: Apr. 27, 1999

[54] PRECISE RAIN GAUGE AND METHODS OF CALIBRATION

[76] Inventor: Gotthard L. Hagstrom, 113 Bass Dr., Interlachen, Fla. 32148

[21] Appl. No.: 08/997,905

[22] Filed: Dec. 24, 1997

[51] Int. Cl.$^6$ .................................................... G01W 1/00
[52] U.S. Cl. ........................... 73/170.23; 73/1.16; 73/1.42
[58] Field of Search ............................ 73/170.17, 170.18, 73/170.23, 1.16, 1.42

[56] References Cited

U.S. PATENT DOCUMENTS

| | | | |
|---|---|---|---|
| 1,308,855 | 7/1919 | Moore | 177/50 |
| 3,243,999 | 4/1966 | Barker | 73/170.23 |
| 3,309,710 | 3/1967 | Smoot et al. | 346/49 |
| 3,485,096 | 12/1969 | Miller | 73/170.23 |
| 3,943,762 | 3/1976 | Baer | 73/171 |

FOREIGN PATENT DOCUMENTS

| | | | |
|---|---|---|---|
| 241668 | 12/1962 | Australia | 73/170.23 |
| 244791 | 5/1963 | Australia | 73/170.23 |

*Primary Examiner*—Richard Chilcot
*Assistant Examiner*—Abdullahi Aw-Musse
*Attorney, Agent, or Firm*—Paul S. Rooy

[57] ABSTRACT

A rain gauge and methods of tilt time calibration and flow rate calibration. The rain gauge comprises a pair of buckets separated by a darn rotatably attached to a base. A threaded balance weight is used to calibrate the rain gauge to equalize the tilt times of the buckets. A pendulum weight turns on a threaded stud attached to a frame is used to calibrate the rain gauge for different flow rates of water reflecting rainfall intensities from 2 in/hr to 12 in/hr. The buckets' outflow is directed into graduated cylinders, which may also be used during calibration. A pair of uprights support a funnel platform having a funnel platform aperture. The funnel platform aperture is sized to precisely hold a funnel in position relative to the bucket assembly, thereby permitting different buckets to be used without having to re-calibrate the rain gauge. A cover having at least one cover aperture is provided which permits visually checking the operation of the rain gauge without having to remove the cover.

8 Claims, 3 Drawing Sheets

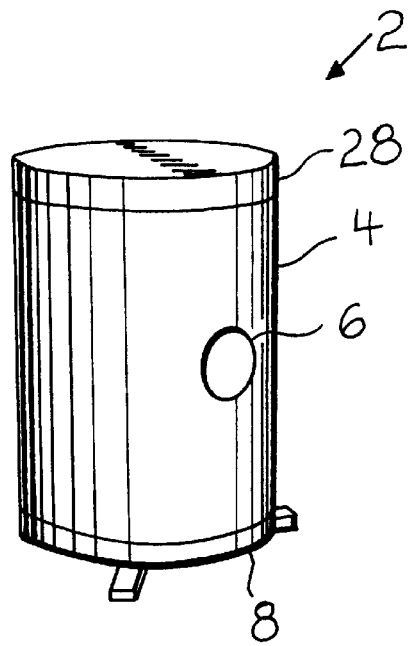
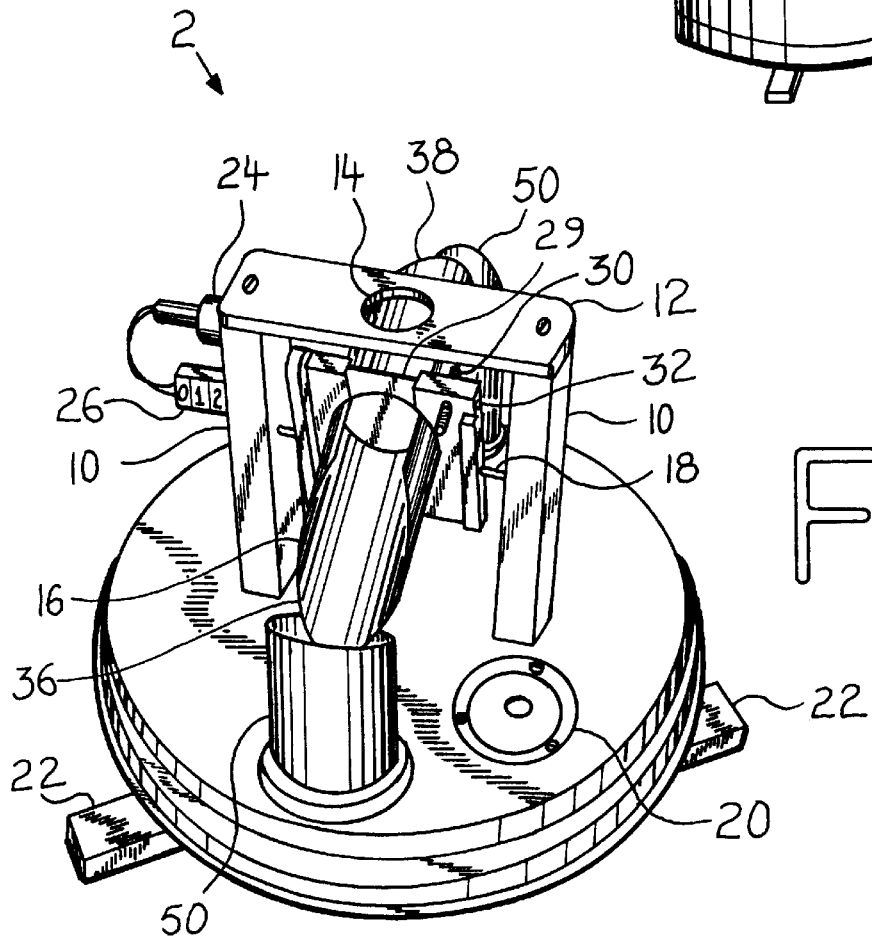

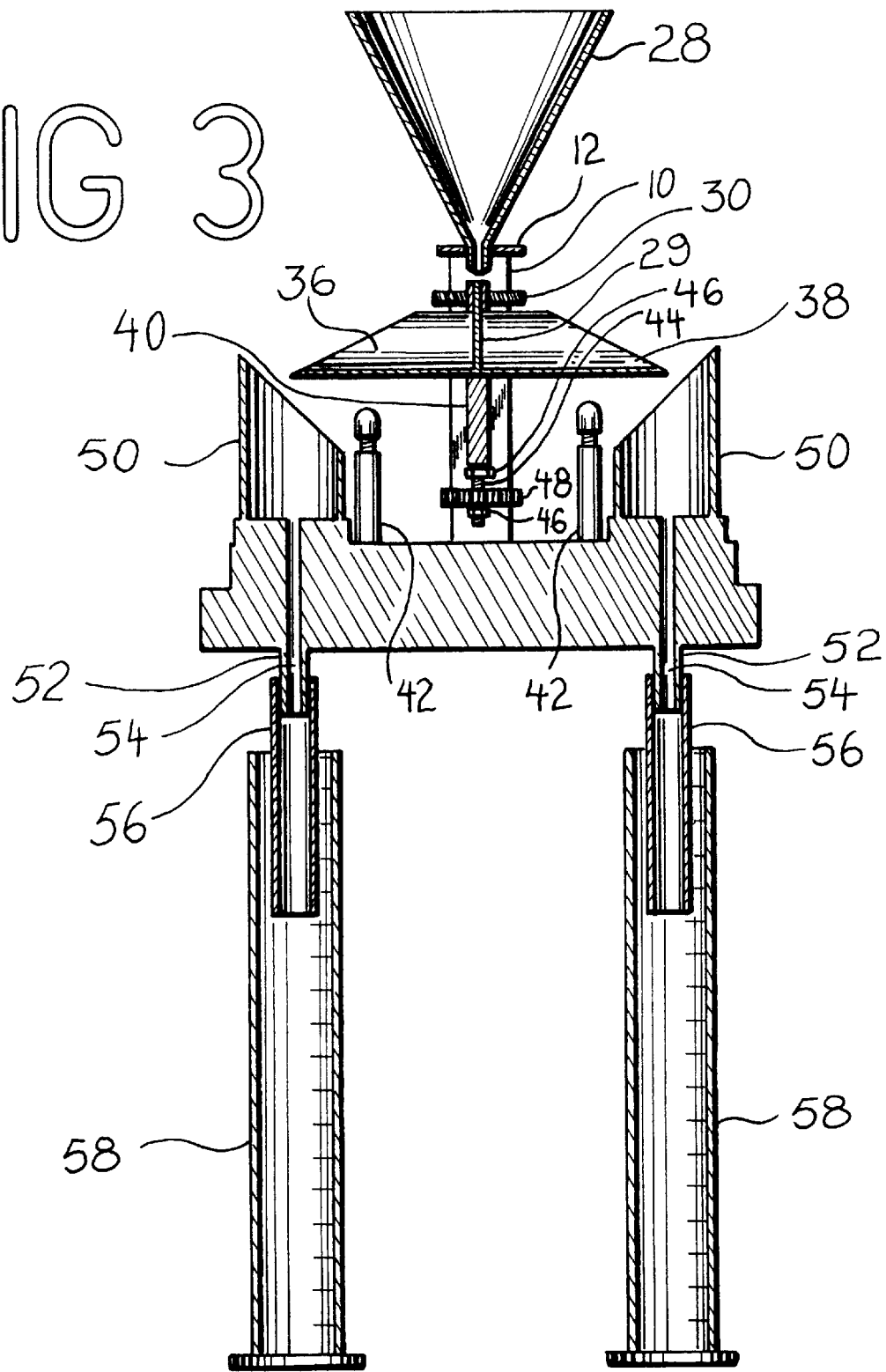

PRECISE RAIN GAUGE AND METHODS OF CALIBRATION

BACKGROUND OF THE INVENTION

1. Field of the Invention

This invention relates to rain gauges, and in particular to a precise rain gauge and methods of calibration.

2. Background of the Invention

Rain gauges are instruments used to measure the amount of rain that falls in a certain place or region during a given period of time. This measurement function is important, because the resultant data may be used to determine the amount of extra irrigation required by crops, to forecast rainfall trends to help plan what specific types of crops to plant, as well as to aid in designing storm-water handling systems and flood control, etc.

3. Existing Designs

A simple rain gauge may comprise a funnel whose output flows into a graduated cylinder with markings calibrated to yield a reading of how many inches of rain have fallen. A more sophisticated design which provides greater accuracy is the tipping buckets design. A tipping bucket rain gauge incorporates a pair of tipping buckets adjacent to each other. The buckets are separated by a dam. In operation, the output of a funnel fills the first bucket. When the first bucket is filled to a pre-determined amount of water—typically 8.238 milliliters (ml) which is equivalent to 0.01 inch (in) of rain—the bucket pair tips, and the second bucket commences to receive the funnel output. The tip is sensed by a hull switch, and recorded by a counter. Total inches rainfall over a period of time equals the number of tips multiplied by 0.01 in.

It is important that the time required to tip the first bucket be as close as possible to the time required to tip the second bucket, given the same rainfall rate. Any variation between tip times of the two buckets contributes to gauge inaccuracy, because water will fall into one bucket longer than into the other. This contributes to a small error with each tip, which can cause an appreciable cumulative error over time. Within the current state of the art, presently available rain gauges are capable of tip time calibration which brings the tip times of the buckets to with 3 seconds (secs) of each other. This time difference contributes to an appreciable cumulative rainfall measurement error over time.

Another problem associated with current tipping bucket rain gauge designs is the inability to accurately calibrate them for different rain intensities. Most commercially available designs are delivered with a set flow rate calibration, typically in the 2–6 inches/hour (in/hr) area. The only method disclosed by the manufacturers to change this calibration is to replace the buckets with different sized buckets.

If the rain were to increase in intensity, for example to 12 in/hr, the momentum of the heavy rainfall imparted to the bucket into which the rainfall were falling would cause pre-mature tipping, resulting under-measurement of the actual rainfall. The instructions for use of currently available rain gauges requires replacement of the buckets with larger ones to accommodate heavier rainfalls flow rates. No method of calibration is currently taught which permits flow rate calibration of a rain gauge without replacing the buckets.

A further problem associated with presently available rain gauges is the lack of a firm funnel mount above the buckets. This deficiency renders funnel replacement cumbersome and difficult, because the rain gauge must be re-calibrated with every funnel replacement, because the replacement funnel output is frequently in a deferent position compared to its predecessor.

Finally, currently available rain gauges incorporate opaque covers which render the inner workings invisible. This visual obstruction makes visual monitoring of the rain gauge operation impossible without removing the entire cover.

SUMMARY OF THE INVENTION

Accordingly, it is an object of the present invention to provide a rain gauge and methods of calibration which teach tip time rain gauge calibration to an accuracy within ±0.5 ml. Design features allowing this object to be accomplished include a threaded balance weight immobilized by a set screw. Advantages associated with the accomplishment of this object include faster and easier tip time calibration, and increased accuracy.

It is another object of the present invention to provide a rain gauge and methods of calibration which teach flow rate calibration for rainfall intensities ranging from 2 in/hr. to 12 in/hr., without having to change the buckets. Design features allowing this object to be accomplished include a pendulum weight on a threaded stud immobilized by a lock nut. Benefits associated with the accomplishment of this object include simplicity, time and material savings, and increased accuracy.

It is still another object of this invention to provide a rain gauge which permits funnel replacement without the necessity of recalibrating the rain gauge. Design features enabling the accomplishment of this object include a funnel platform firmly mounted to uprights, and a funnel platform aperture in the funnel platform. Advantages associated with the realization of this object include simplicity, time and material savings, and increased accuracy.

It is another object of the present invention to provide a rain gauge which permits the inner components such as the bucket assembly and bucket stops to be visible from the outside of the cover, without having to remove the cover. Design features allowing this object to be accomplished include a cover incorporating at least one cover aperture. A benefit associated with the accomplishment of this object is the ability to verify correct rain gauge operation without having to remove the cover.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIGS. 1 and 2. Sheet two contains FIG. 3. Sheet three contains FIGS. 4 and 5.

FIG. 1 is a front isometric view of a rain gauge.

FIG. 2 is a front isometric view of a rain gauge with cover removed.

FIG. 3 is a front cross-sectional view of a rain gauge with graduated cylinders positioned to capture the water which was measured by the rain gauge.

DETAILED DESCRIPTION OF THE PREFERRED EMBODIMENT

Figure 4:
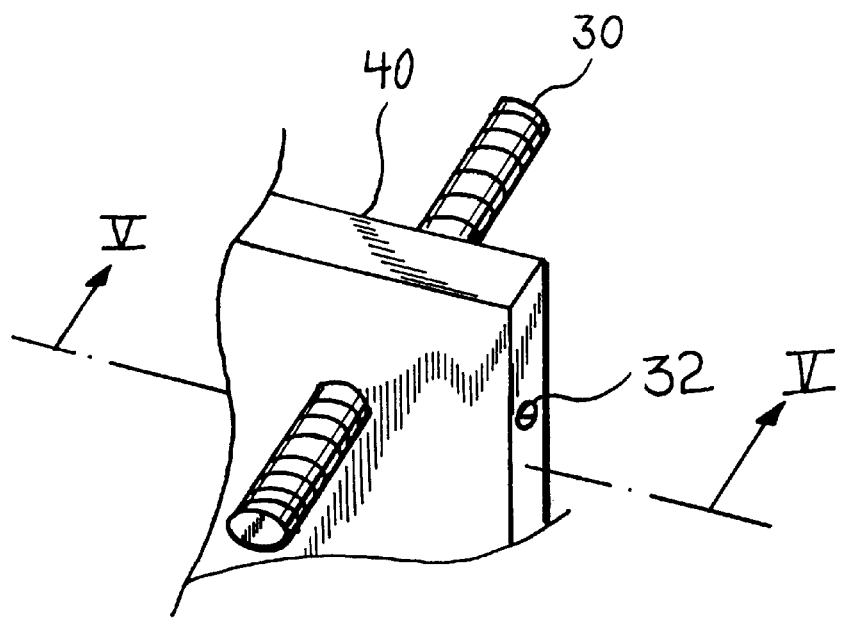
FIG. 4 is a front isometric view of the adjustable attachment between threaded balance weight 30 and frame 40.

FIG. 1 is a front isometric view of rain gauge 2. Rain gauge 2 comprises cover 4, which protects the inner workings of rain gauge 2 from the elements. Cover 4 rests on base 8. Funnel 28 fits into the top of cover 4, and directs water into first bucket 36 and second bucket 38. Cover comprises at least one cover aperture 6, which permits visibility into rain gauge 2, to ensure its proper operation.

FIG. 2 is a front isometric view of rain gauge 2 with cover 4 removed. Funnel 28 rests in funnel platform aperture 14, which is contained in funnel platform 12. Funnel platform 12 is held in position by uprights 10, which are attached to base 8.

Rain is directed by funnel 28 into either first bucket 36 or second bucket 38. In FIG. 2, rain is being directed into second bucket 38. When a predetermined weight of water is present in second bucket 38, bucket assembly 16 tips such that second bucket 38 travels downwards and discharges its water into receptacle 50. As second bucket 38 tips downwards, first bucket 36 tips upwards, and dam 29 crosses the water output of funnel 28. Now rain water is directed by funnel 28 into first bucket 36, and the cycle repeats.

Every tip of bucket assembly 16 is sensed by hull switch 24, and counted by counter 26. The amount of rainfall measured is related to the product of the number of tips and the amount of water in each bucket required to trigger a tip, and is also related to the top inside diameter of funnel 28. In the United States, the industry standard is to calibrate rain gauges so that 8.238 ml of water in a bucket triggers a tip.

FIG. 3 is a front cross-sectional view of rain gauge 2 with graduated cylinders 58 positioned to capture the water which was measured by rain gauge 2. The outflow of receptacles 50 travels through receptacle tube bores 54 of receptacle tubes 52, through hoses 56 attached to receptacle tubes 52, and from thence into graduated cylinders 58. The water collected in graduated cylinders 58 is used during flow rate calibration.

Bucket assembly 16 comprises first bucket 36 separated from second bucket 38 by dam 29. Buckets 36 and 38, and dam 29 are attached to frame 40. Frame 40 is rotatably attached to uprights 10 by axles 18, such that bucket assembly 16 is free to seesaw relative to base 8. The rotational motion of bucket assembly 16 relative to base 8 is limited at either end of travel by vertically adjustable bucket stops 42.

Figure 5:
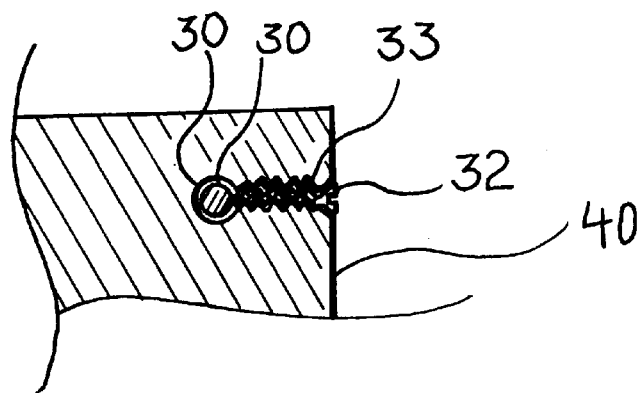
FIG. 5 is a cross-sectional view of the adjustable attachment between threaded balance weight 30 and frame 40 taken at section V—V of FIG. 4.

FIG. 4 is a front isometric view of the adjustable attachment between threaded balance weight 30 and frame 40. FIG. 5 is a cross-sectional view of the adjustable attachment between threaded balance weight 30 and frame 40 taken at section V—V of FIG. 4.

Referring now also to FIGS. 4 and 5, frame 40 further comprises balance weight threaded bore 31 disposed substantially perpendicular to frame 40, and set screw threaded bore 33 communicating with balance weight threaded bore 31. Threaded balance weight 30 is sized to mate with balance weight threaded bore 31. Thus, turning threaded balance weight 30 relative to frame 40 causes threaded balance weight 30 to translate axially relative to bucket assembly 16, thereby adjusting the balance of bucket assembly 16 on axles 18. Tip time calibration is performed by adjusting the position of threaded balance weight 30 relative to frame 40 until the first bucket 36 tip time is within the desired tolerance of the second bucket 38 tip time. In the preferred embodiment, it was possible to calibrate rain gauge 2 such that bucket tip times were within 0.5 secs of each other, which is highly accurate compared to the industry standard of 3 secs.

When initially installed, vertically adjustable feet 22 are adjusted so that base 8 is horizontal. This is accomplished by reference to level 20.

Bucket assembly 16 further comprises threaded stud 44 attached to the lower edge of frame 40. Pendulum weight 48 is comprises a threaded bore sized to mate with threaded stud 44. Thus, rotation of pendulum weight 48 changes the distance between pendulum weight 48 and frame 40. The distance between pendulum weight 48 and frame 40 is adjusted when flow rate calibration is performed on rain gauge 2. Once rain gauge is calibrated for flow rate, pendulum weight 48 is immobilized relative to threaded stud 40 by means of lock nut 46 on threaded stud 44.

Generally, rain gauges must be calibrated two ways: tip time calibration, so that gauge accuracy is not compromised by unequal tip times, and flow rate calibration, so that momentum transfer effects due to heavy rainfall doesn't produce a reading which is too low.

Method of Tilt Time Calibration

A. Set the position of threaded balance weight 30 relative frame 40 by rotating threaded balance weight 30 relative to frame 40, until frame 40 is approximately centered on threaded balance weight 30.

B. Lightly tighten set screw 32.

C. Pour water into funnel 28 at a constant rate.

D. Measure tip time for first bucket 36 and second bucket 38, several times each.

E. If one bucket has a lower tip time than the other, loosen set screw 32 and move threaded balance weight 30 toward the slower tipping bucket, then lightly re-tighten set screw 32.

F. Repeat steps C–E until the average tip times for both buckets are within the desired tolerance. In the preferred embodiment, rain gauge 2 could routinely be calibrated so that tip times were within 0.5 sec of each other.

G. Empty both graduated cylinders, and pour an amount of water into funnel 28.

H. Compare the amount of water in each cylinder—they should be equal. If not, loosen set screw 32, move threaded balance weight toward the bucket which delivered more water to its cylinder, then lightly re-tighten set screw 32.

I. Repeat steps G–H until the volume of the water in the cylinders is within the desired tolerance. In the preferred embodiment, rain gauge 2 could be calibrated so that the outputs of the buckets were within 0.5 ml of each other, or better.

J. When threaded balance weight 30 is at the optimal position, lock it in place with set screw 32.

Flow Rate Calibration

Rain gauges are typically calibrated in a laboratory environment. In order to save time when calibrating rain gauges, an abbreviated calibration time may be used. One common standard developed by the U.S. Water Management Districts uses the following formula:

$$V = A \times C \times T + W$$

where V is calibration volume (in/hr), A=Area of collecting surface (an 8 in top inside diameter funnel is standard, making A=50.625 in$^2$), C=conversion factor (0.1639 ml/0.01 in$^3$), T=number of tips per 197.8 ml (24 tips), and W=volume lost to wicking and wetting of test equipment (approx. 2 ml).

During the flow calibration of currently available rain gauges, typically 197.8 ml of water is poured through the funnel at a rate of somewhere between 2 and 6 in/hr, starting with empty but wetted buckets. Exactly 24 tips should ensue. If too many tips occur, the distance between pendulum weight 48 and frame 40 is increased, and the process repeated. If too few tips occur, the distance between pendulum weight 48 and frame 40 is decreased, and the process repeated, until the correct number of tips occurs. Currently available rain gauges are delivered with the distance between pendulum weight 48 pre-set, with no method taught to alter the flow rate from a rate of approximately 2–6 in/hr. Thus, if these gauges are used to measure heavy rainfalls, such as 12 in/hr, they will yield incorrectly high measurements. This occurs because in the presence of high flow rates associated with heavy rains, bucket assembly 16 will tip before the individual buckets are completely full, due to the momentum of heavily falling rain imparted to the buckets. The only method to calibrate rain gauges for high flow rates associated with heavy rains taught by currently available rain gauges is to replace the standard buckets with larger buckets.

The instant invention teaches the following method to calibrate rain gauge 2 for different flow rates:

A. Set the distance between pendulum weight 48 and frame 40 to the correct initial distance, which has been determined experimentally, for the flow rate for which rain gauge 2 is to be calibrated, and lightly tighten lock nut 46. In the preferred embodiment, it was determined experimentally that the distance between pendulum weight 48 and frame 40 should be 0.450–0.460 in, 0.510–0.525 in and 0.600–0.625 in for flow rates of 2 in/hr, 6 in/hr and 12 in/hr respectively.

B. With buckets empty but wetted, pour a pre-determined amount of water through funnel 28 at the flow rate for which rain gauge 2 is to be calibrated (e.g. 2 in/hr, 6 in/hr, or 12 in/hr). In the preferred embodiment, 197.8 ml water was poured through funnel 28, which in accordance with water management district standards, should yield exactly 24 tips.

C. If too many tips occur, increase the distance between pendulum weight 48 and frame 40. If too few tips occur, the decrease the distance between pendulum weight 48 and frame 40.

D. Repeat steps B–C until the correct number of tips occur.

E. Empty both graduated cylinders and pour in a continuous flow of water at the rate for which rain gauge 2 is to be calibrated.

F. After a predetermined time has passed, continue the flow but note the contents of both graduated cylinders 58. The total water amount contained in both graduated cylinders 58 should equal the amount of water measured by rain gauge 2 during the test time period.

G. If the water contained in graduated cylinders 58 at the end of the test period is less than that measured by rain gauge 2 during the test period, increase the distance between pendulum weight 48 and frame 40. If water contained in graduated cylinders 58 at the end of the test period is more than that measured by rain gauge 2 during the test period, decrease the distance between pendulum weight 48 and frame 40.

H. Repeat steps E–G until the amount of water contained in graduated cylinders 58 at the end of the test period is equal to the amount of water poured into funnel 28 during the test period to within the tolerance desired. In the preferred embodiment, an accuracy of within 0.5 ml was routinely achieved.

I. At the conclusion of flow calibration, tighten lock nut 46 against pendulum weight 48.

While a preferred embodiment of the invention has been illustrated herein, it is to be understood that changes and variations may be made by those skilled in the art without departing from the spirit of the appending claims.

DRAWING ITEM INDEX 2 rain gauge
4 cover
6 cover aperture
8 base
10 upright
12 funnel platform
14 funnel platform aperture
16 bucket assembly
18 axle
20 level
22 foot
24 hull switch
26 counter
28 funnel
29 dam
30 threaded balance weight
31 balance weight threaded bore
32 set screw
33 set screw threaded bore
36 first bucket
38 second bucket
40 frame
42 bucket stop
44 threaded stud
46 lock nut
48 pendulum weight
50 receptacle
52 receptacle tube
54 receptacle tube bore
56 hose
58 graduated cylinder

I claim:

1. A rain gauge comprising a bucket assembly rotatably attached to a base, said bucket assembly comprising a frame and two buckets separated by a dam, a balance weight threaded bore in said frame, and a threaded balance weight sized to mate with said balance weight threaded bore in said balance weight threaded bore, said balance weight being disposed substantially, parallel to said bucket assembly, whereby rotating said threaded balance weight relative to said frame causes said threaded balance weight to, translate axially relative to said bucket assembly, said frame further comprising a set screw threaded bore communicating with said balance weight threaded bore, and a set screw sized to mate with said set screw threaded bore disposed in said set screw threaded bore, whereby said set screw may be tightened on said threaded balance weight, thereby immobilizing said threaded balance weight relative to said frame.

2. A rain gauge comprising a bucket assembly rotatably attached to a base, said bucket assembly comprising a frame and two buckets separated by a dam, a receptacle under each bucket output attached to said base, a receptacle tube bore communicating with an inside of each said receptacle and emerging through a receptacle tube, whereby hoses may be emplaced on said receptacle tubes to channel receptacle outflow.

3. A method of rain gauge tip time calibration, said rain gauge comprising a funnel, a bucket assembly rotatably attached to a base, said bucket assembly comprising a first bucket and a second bucket attached to a frame, a balance weight threaded bore in said frame, and a threaded balance weight sized to mate with said balance weight threaded bore disposed in said balance weight threaded bore, said method comprising the following steps:

A. Positioning said threaded balance weight relative to said frame by rotating said threaded balance weight relative to said frame until said frame is approximately centered on said threaded balance weight;

B. Pouring water into said funnel at a constant rate;

C. Measuring tip time for said first bucket and said second bucket, several times each;

D. If one said bucket has a lower tip time than the other, moving said threaded balance weight toward the slower tipping bucket by rotating said threaded balance weight relative to said frame;

E. Repeating steps B–D until average tip times for both said buckets are within a desired tolerance.

4. The method of rain gauge tip time calibration of claim 3 wherein said rain gauge further comprises a receptacle under each bucket output attached to said base, each said receptacle communicating with a graduated cylinder by means of a receptacle tube bore, said method comprising the further steps of:

F. Emptying both said graduated cylinders, and pouring an amount of water into said funnel;

G. Comparing water collected in each cylinder—they should be equal; if not, moving said threaded balance weight toward a said bucket which delivered more water to its graduated cylinder;

H. Repeating steps F–G until water collected in each said cylinder is equal to a desired tolerance.

5. A method of rain gauge flow rate calibration, said rain gauge comprising a funnel, and a bucket assembly rotatably attached to a base, said bucket assembly comprising a frame and two buckets separated by a dam, a threaded stud attached to said frame, a pendulum weight sized to mate with said threaded stud on said threaded stud, whereby rotation of said pendulum weight on said threaded stud varies a distance between said pendulum weight and said frame, said method of rain gauge flow rate calibration comprising the following steps:

A. Setting a distance between said pendulum weight and said frame to an experimentally determined initial distance appropriate to a flow rate for which said rain gauge is to be calibrated;

B. With said buckets empty, pouring a pre-determined amount of water through said funnel at a flow rate for which said rain gauge is to be calibrated;

C. Counting a number of tips made by said bucket assembly;

D. If too many tips occur, increasing said distance between said pendulum weight and said frame; if too few tips occur, decreasing said distance between said pendulum weight and said frame;

E. Repeating steps B–D until a correct number of tips occurs.

6. The method of rain gauge flow rate calibration of claim 5 wherein said distance between said pendulum weight and said frame is initially set to 0.440–0.480 in, 0.500–0.550 in and 0.590–0.650 in for flow rates of 2 in/hr, 6 in/hr and 12 in/hr respectively.

7. The method of rain gauge flow rate calibration of claim 5 wherein said rain gauge further comprises a receptacle under each bucket output attached to said base, each said receptacle communicating with a graduated cylinder, said method comprising the further steps of:

F. Emptying both said graduated cylinders and pouring a water into said funnel at a constant rate for which said rain gauge is to be calibrated;

G. After a pre-determined time has passed, continuing the water flow but noting water contents of both said graduated cylinders—total water contents of both said cylinders should equal a water amount measured by said rain gauge;

H. If water contained in said graduated cylinders at a test period end is less than that measured by said rain gauge during said test period, increasing said distance between said pendulum weight and said frame; if water contained in said graduated cylinders at said test period end is more than that measured by said rain gauge during said test period, decreasing said distance between said pendulum weight and said frame;

I. Repeating step H until water contained in said graduated cylinders at said test period end is equal to an amount of water measured by said rain gauge during said test period within a desired tolerance.

8. A rain gauge comprising a funnel, and a bucket assembly rotatably attached to a base, said bucket assembly comprising a frame and two buckets separated by a dam, a pair of uprights attached to said base, a funnel platform attached to an end of said uprights opposite said base, a funnel platform aperture in said funnel platform, a lower extreme of said funnel being sized to fit securely within said funnel platform aperture, whereby a funnel output is located precisely relative to said bucket assembly, thereby permitting funnel replacement without having to recalibrate said rain gauge upon every funnel replacement.

* * * * *

UNITED STATES PATENT AND TRADEMARK OFFICE
CERTIFICATE OF CORRECTION

PATENT NO.    : 5,898,110
DATED         : April 27, 1999
INVENTOR(S)   : Gotthard L. Hagstrom It is certified that error appears in the above-identified patent and that said Letters Patent is hereby corrected as shown below:

On the title page,

<u>Abstract  line 3</u>    "darn" *should read* "dam"
<u>Column 3 line 3</u>    "...Cover comprises" *should read* "...Cover 4 comprises"

Signed and Sealed this

Twenty-eighth Day of September, 1999

Attest:

Q. TODD DICKINSON

*Attesting Officer*    *Acting Commissioner of Patents and Trademarks*